(12) United States Patent
Faber et al.

(10) Patent No.: US 6,302,465 B1
(45) Date of Patent: Oct. 16, 2001

(54) CARGO RESTRAINING GATE ASSEMBLY AND METHOD

(76) Inventors: Michael W. Faber, 833 Abbie St.; Michael P. Podkomorka, 857 Abbie St., both of Pleasanton, CA (US) 94566

( * ) Notice: Subject to any disclaimer, the term of this patent is extended or adjusted under 35 U.S.C. 154(b) by 0 days.

(21) Appl. No.: 09/398,275

(22) Filed: Sep. 20, 1999

(51) Int. Cl.$^7$ .............. B60R 13/07; B62D 33/00; B61D 45/00
(52) U.S. Cl. .............. 296/39.1; 296/39.2; 296/50; 410/118; 410/129
(58) Field of Search .................. 296/39.1, 39.2, 296/50, 26.09, 26.1; 410/117, 118, 129, 141, 142

(56) References Cited

U.S. PATENT DOCUMENTS

| | | | |
|---|---|---|---|
| 3,653,710 | * | 4/1972 | Barnard ............ 296/39.1 |
| 3,881,768 | * | 5/1975 | Nix ................ 296/39.2 |
| 4,222,695 | | 9/1980 | Sarides . |
| 4,277,097 | * | 7/1981 | Lalanne ........... 296/37.16 |
| 4,580,828 | * | 4/1986 | Jones .............. 296/57 |
| 4,629,390 | * | 12/1986 | Burke ............. 296/39.2 |
| 4,763,944 | * | 8/1988 | Fry et al. ......... 296/50 |
| 4,767,150 | * | 8/1988 | Hall ............... 410/142 |
| 4,875,730 | | 10/1989 | Justice . |
| 4,930,834 | * | 6/1990 | Moore ............. 296/50 |
| 4,990,049 | * | 2/1991 | Hargrove ......... 414/537 |
| 4,997,227 | * | 3/1991 | Falzone et al. .... 296/37.6 |
| 5,011,208 | * | 4/1991 | Lewallen ......... 296/37.16 |
| 5,083,831 | * | 1/1992 | Foyen ............. 296/39.1 |
| 5,104,172 | * | 4/1992 | Schildt ............ 296/50 |
| 5,110,172 | * | 5/1992 | Ney et al. ........ 296/50 |
| 5,131,709 | | 7/1992 | Spica . |
| 5,257,846 | * | 11/1993 | Kanai et al. ...... 296/37.16 |
| 5,352,008 | * | 10/1994 | Denvir ............ 296/50 |
| 5,366,124 | | 11/1994 | Dearborn . |
| 5,395,682 | * | 3/1995 | Holland et al. .... 296/50 |
| 5,456,514 | | 10/1995 | Justice . |
| 5,464,264 | | 11/1995 | Wilson . |
| 5,533,773 | * | 7/1996 | Lessick ........... 296/50 |
| 5,542,591 | * | 8/1996 | Moore et al. ...... 296/50 |
| 5,549,428 | | 8/1996 | Yeatts . |
| 5,570,921 | | 11/1996 | Brooker . |
| 5,597,193 | | 1/1997 | Conner . |
| 5,599,055 | | 2/1997 | Brown . |
| 5,615,922 | | 4/1997 | Blanchard . |
| 5,632,520 | * | 5/1997 | Butz ............... 296/37.16 |
| 5,655,863 | | 8/1997 | Mundt . |
| 5,669,537 | | 9/1997 | Saleem et al. . |
| 5,673,956 | | 10/1997 | Emery . |
| 5,685,593 | | 11/1997 | O'Conner . |
| 5,702,143 | * | 12/1997 | Shimazaki ........ 296/37.16 |

(List continued on next page.)

Primary Examiner—Joseph D. Pape
Assistant Examiner—Hilary Gutman
(74) Attorney, Agent, or Firm—Flehr Hohbach Test Albritton & Herbert

(57) ABSTRACT

A stowable cargo restraining gate assembly (10, 10', 10", 10''') for restraining cargo (100) in a cargo space (30) of a transport vehicle (40). The assembly preferably includes a bed liner structure (20, 20', 20", 20''')that may be positioned on the bed of the cargo space (30) and at least one gate member (60, 60', 60", 60''') that may be flexible or rigid. When not deployed to retain cargo, the gate member (60, 60', 60", 60''') is storable in a gate storage cavity (70, 70', 70", 70''')in the bed liner. In one embodiment, a flexible gate member (60) is rolled about an axle (110) and stored in a cavity (70) in the bed liner (20). During use, an end member (50) of the flexible gate member is pulled to unroll a length thereof that may be used to close a side of the cargo space (30), preferably the rear of aft end (31) of the storage space. In other embodiments, the gate member (60', 60", 60''') is rigid and when deployed or stowed, may be moved out of and back into a gate storage cavity (70, 70', 70", 70''') in the bed liner (20, 20', 20", 20'''). The bed liner structure (70''') may also accommodate a drawer assembly (200) in which additional cargo may be stored.

24 Claims, 12 Drawing Sheets

U.S. PATENT DOCUMENTS

| | | | |
|---|---|---|---|
| 5,711,568 * | 1/1998 | Diem et al. | 296/37.16 |
| 5,722,710 | 3/1998 | Falciani . | |
| 5,743,589 | 4/1998 | Felker . | |
| 5,788,309 | 8/1998 | Emery et al. . | |
| 5,788,310 | 8/1998 | McKee . | |
| 5,788,311 | 8/1998 | Tibbals . | |
| 5,803,531 | 9/1998 | Nielsen . | |
| 5,806,909 * | 9/1998 | Wise | 296/39.2 |
| 5,865,495 * | 2/1999 | Nguyen | 296/50 |
| 5,947,358 * | 9/1999 | Wieczorek | 296/37.16 |
| 6,015,178 | 1/2000 | Haack . | |
| 6,017,075 * | 1/2000 | Emery et al. | 296/39.1 |
| 6,053,554 * | 4/2000 | Doniaz | 296/50 |

* cited by examiner

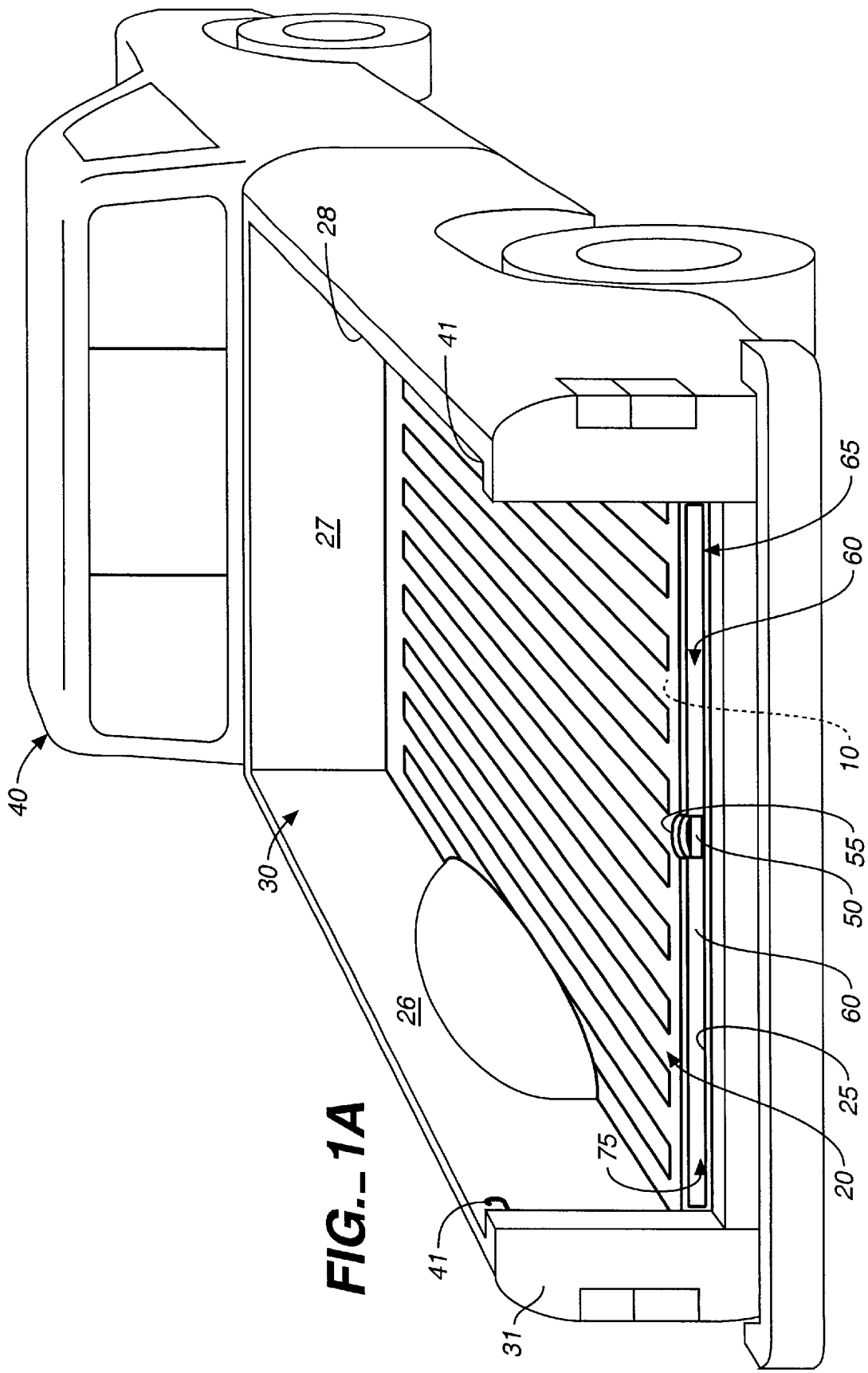

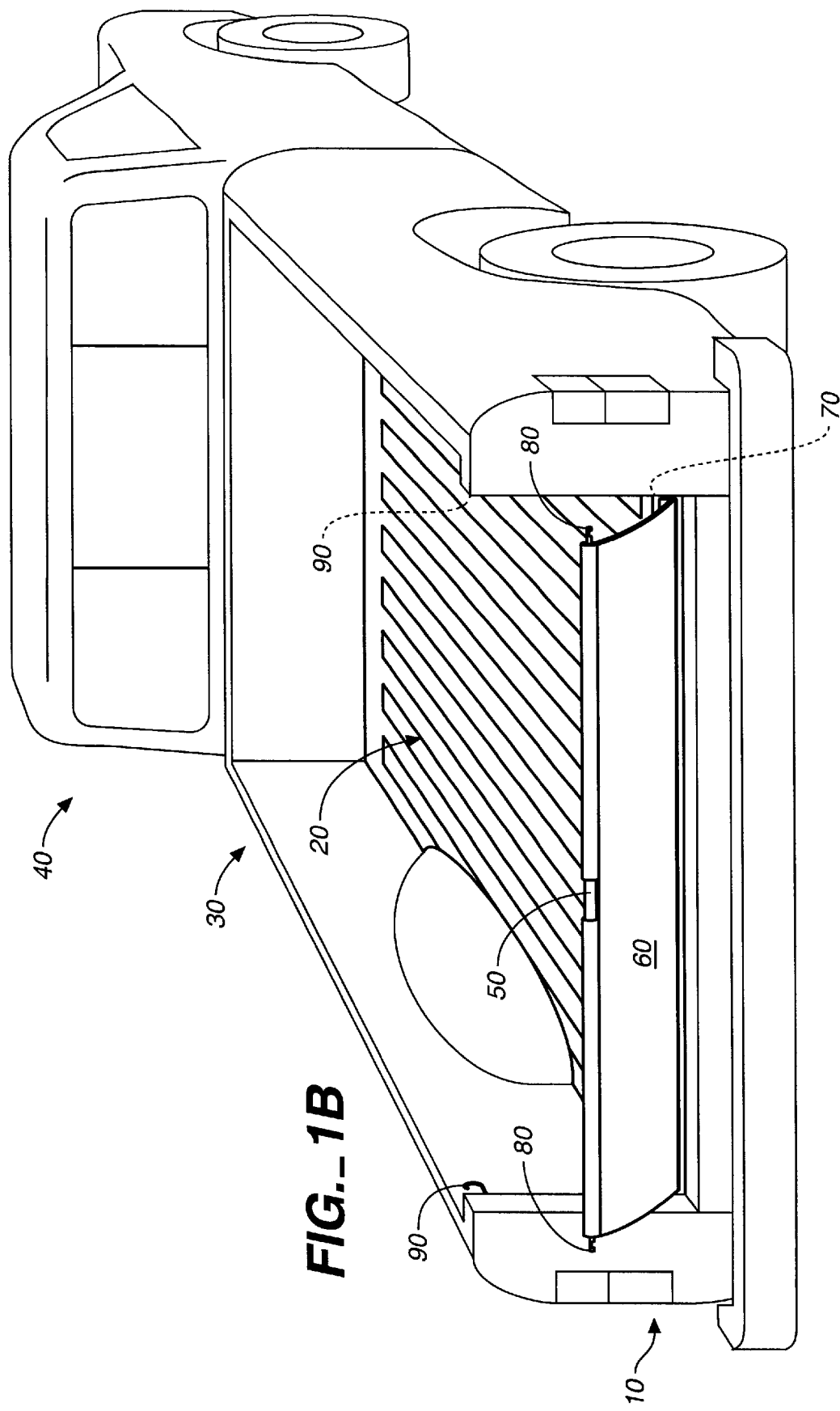
FIG._1B

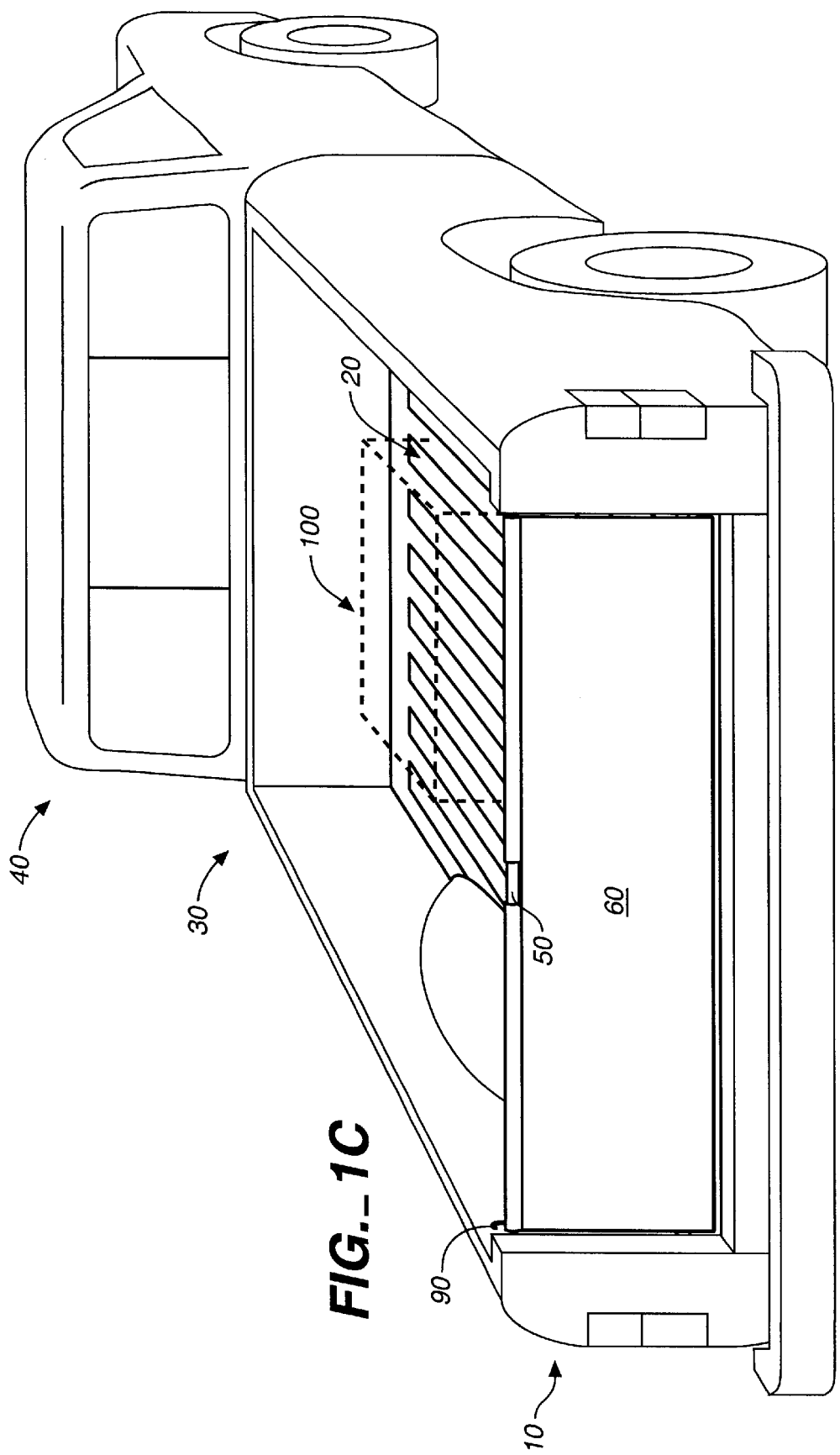

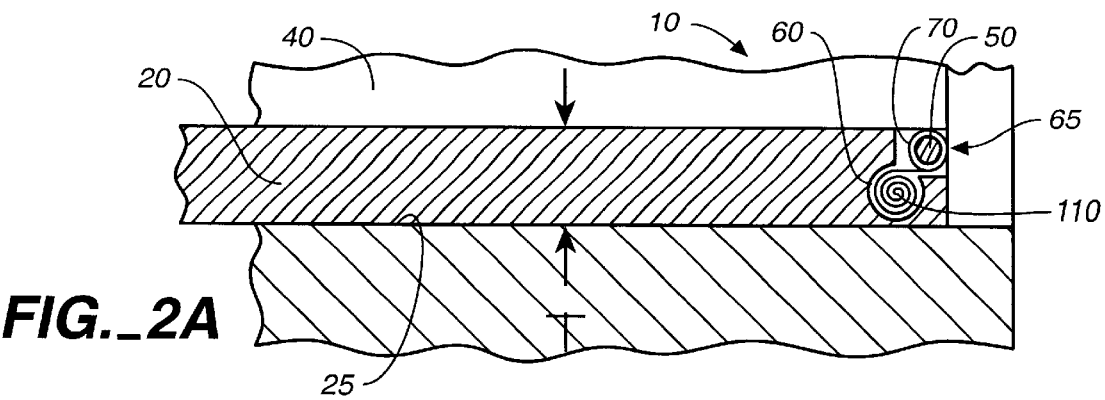
FIG._2A
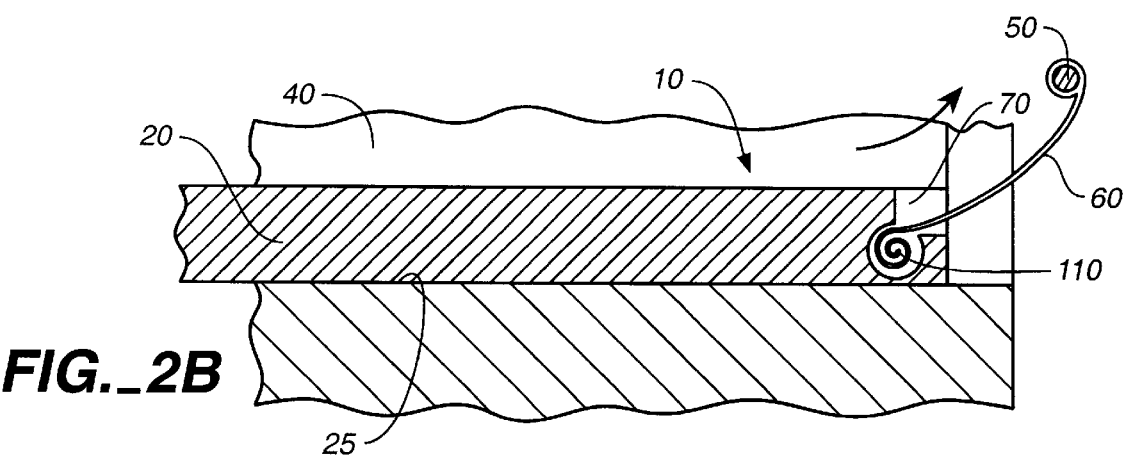
FIG._2B
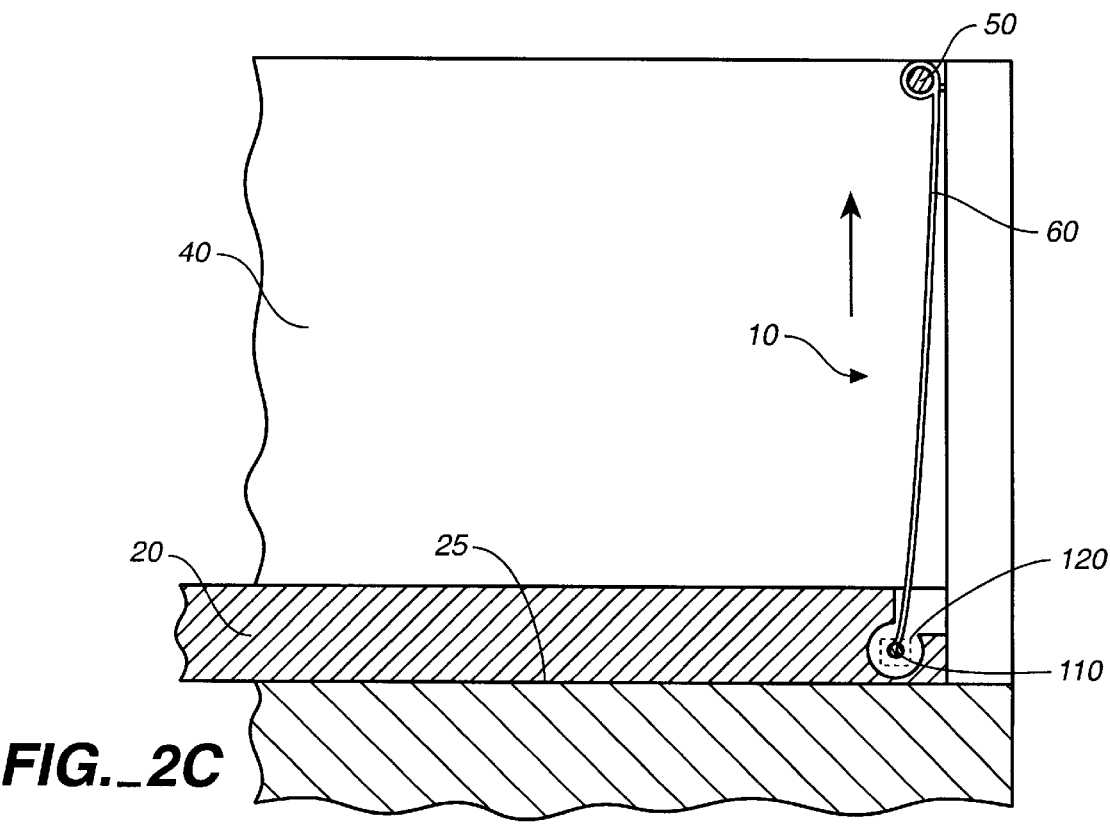
FIG._2C

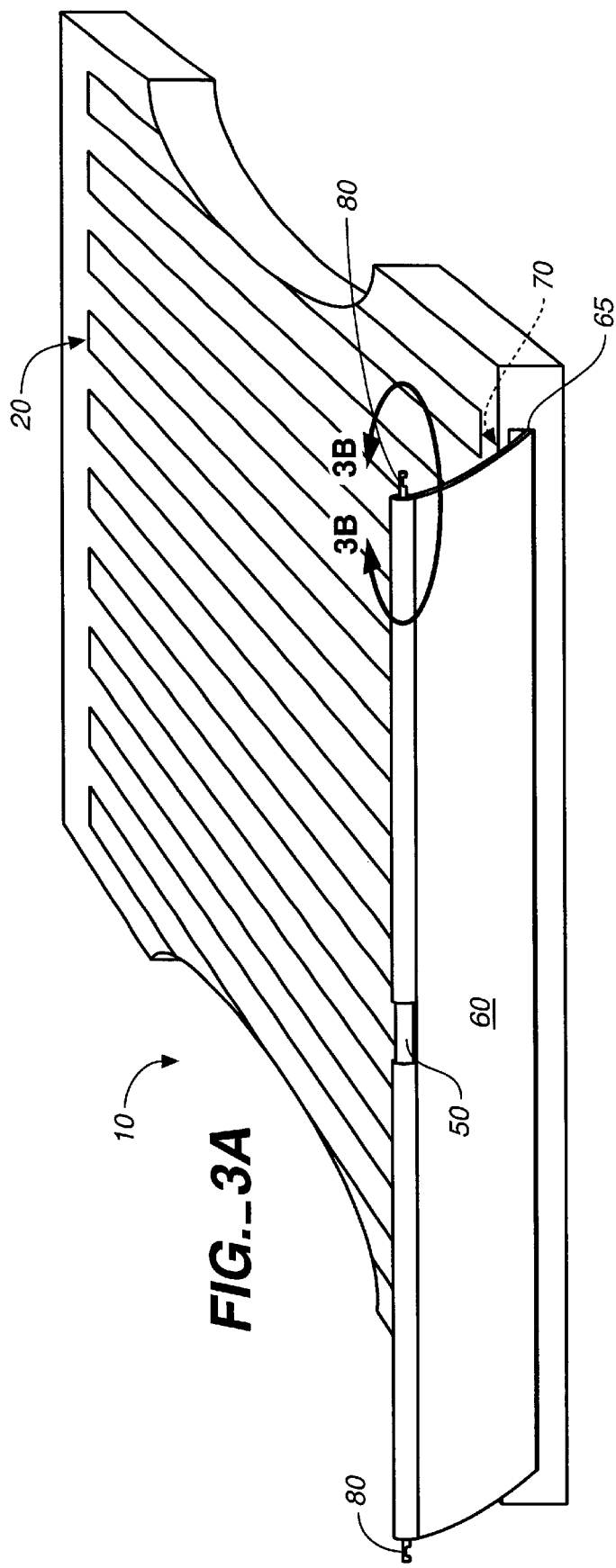
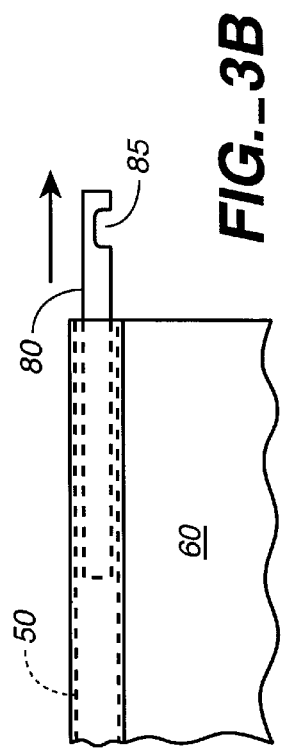
FIG._3A
FIG._3B

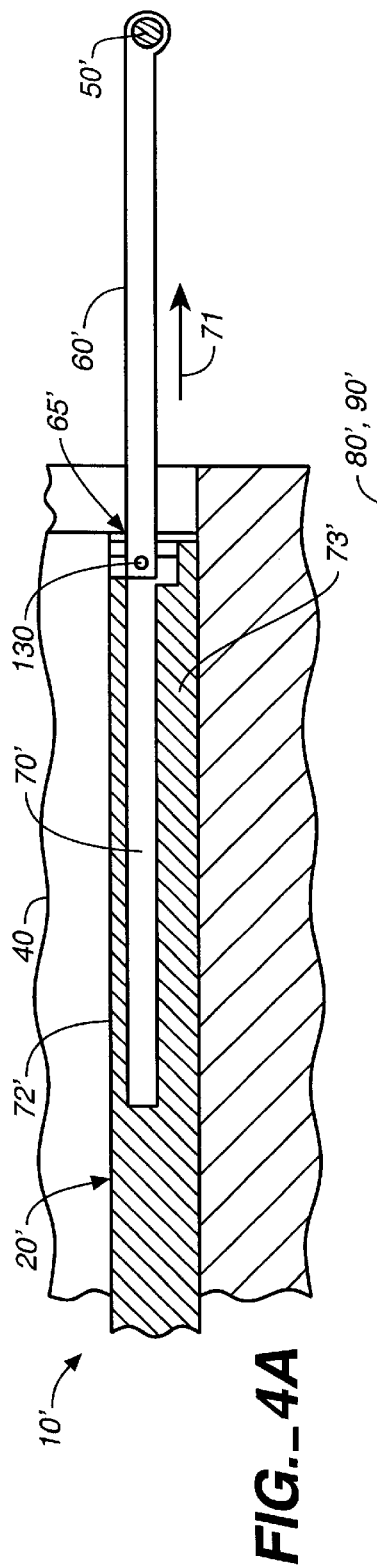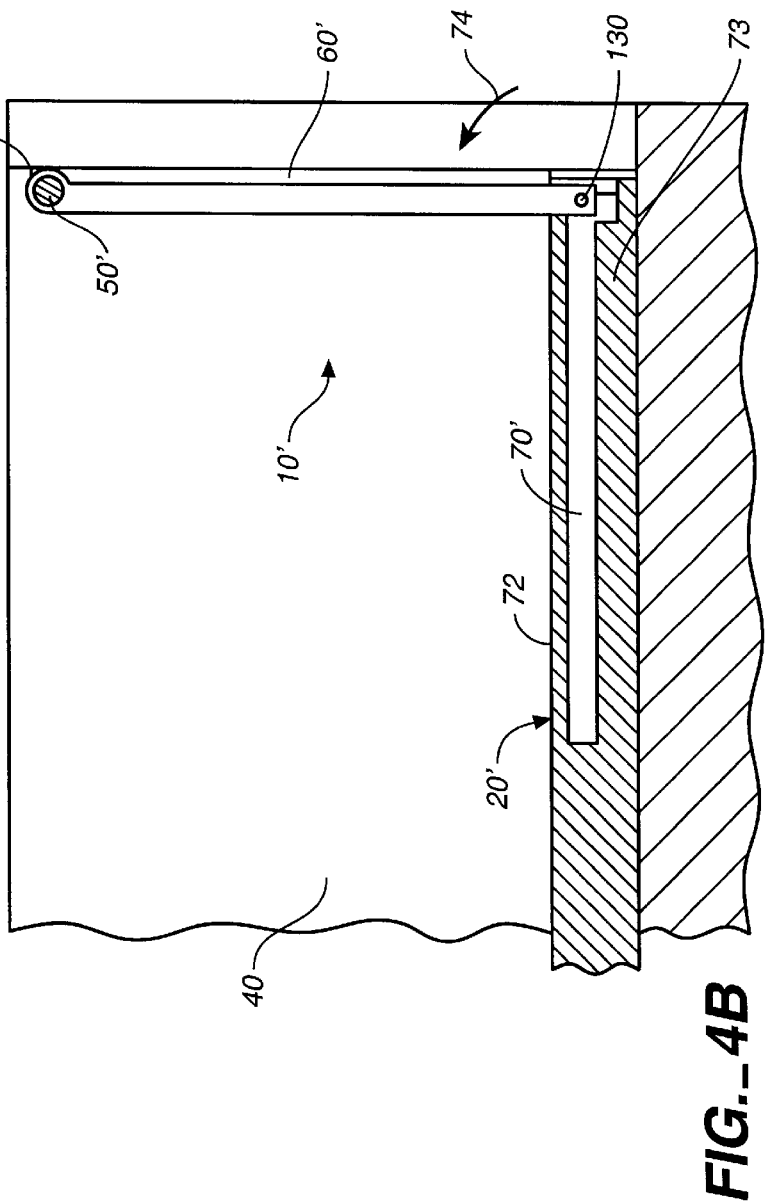

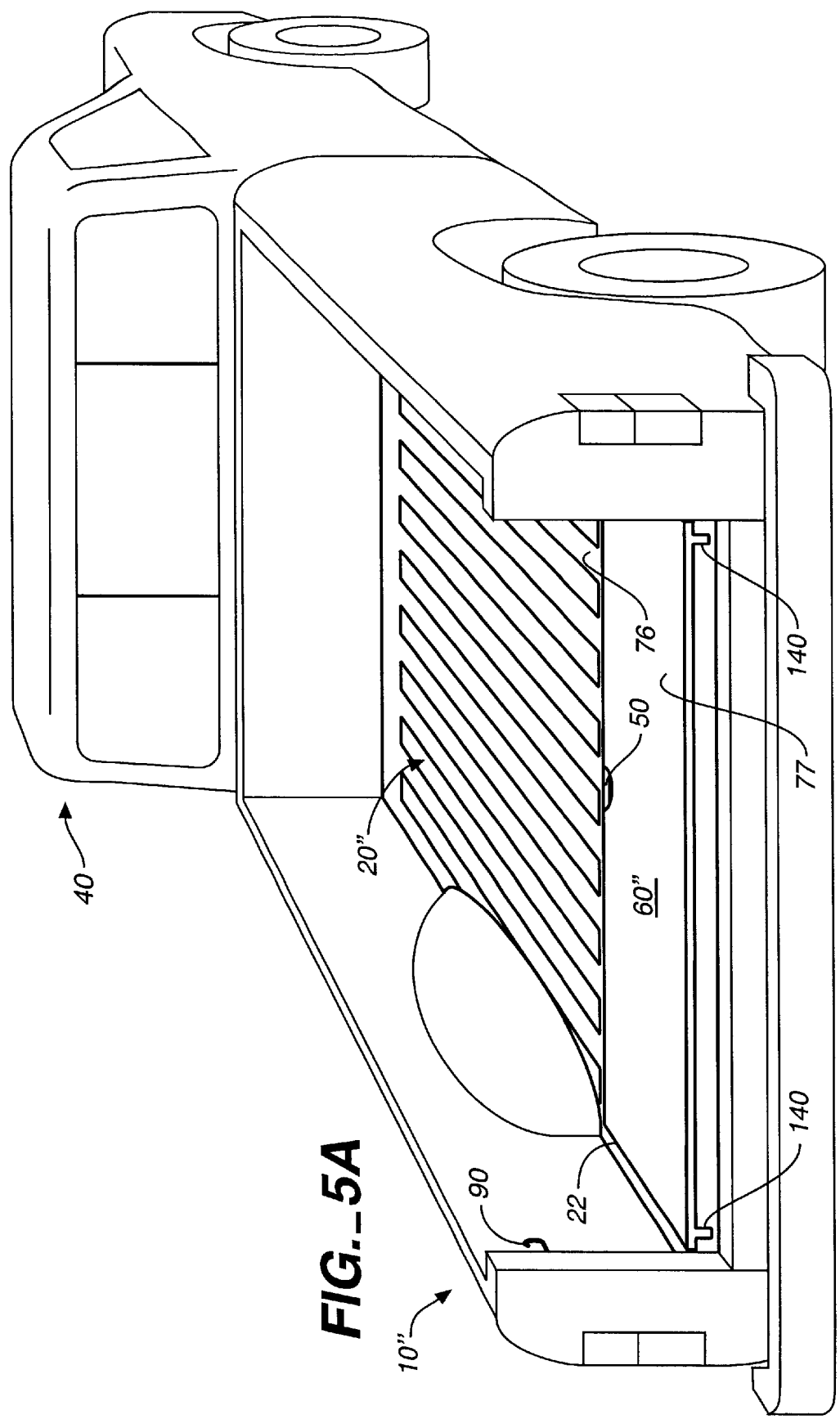
FIG._5A

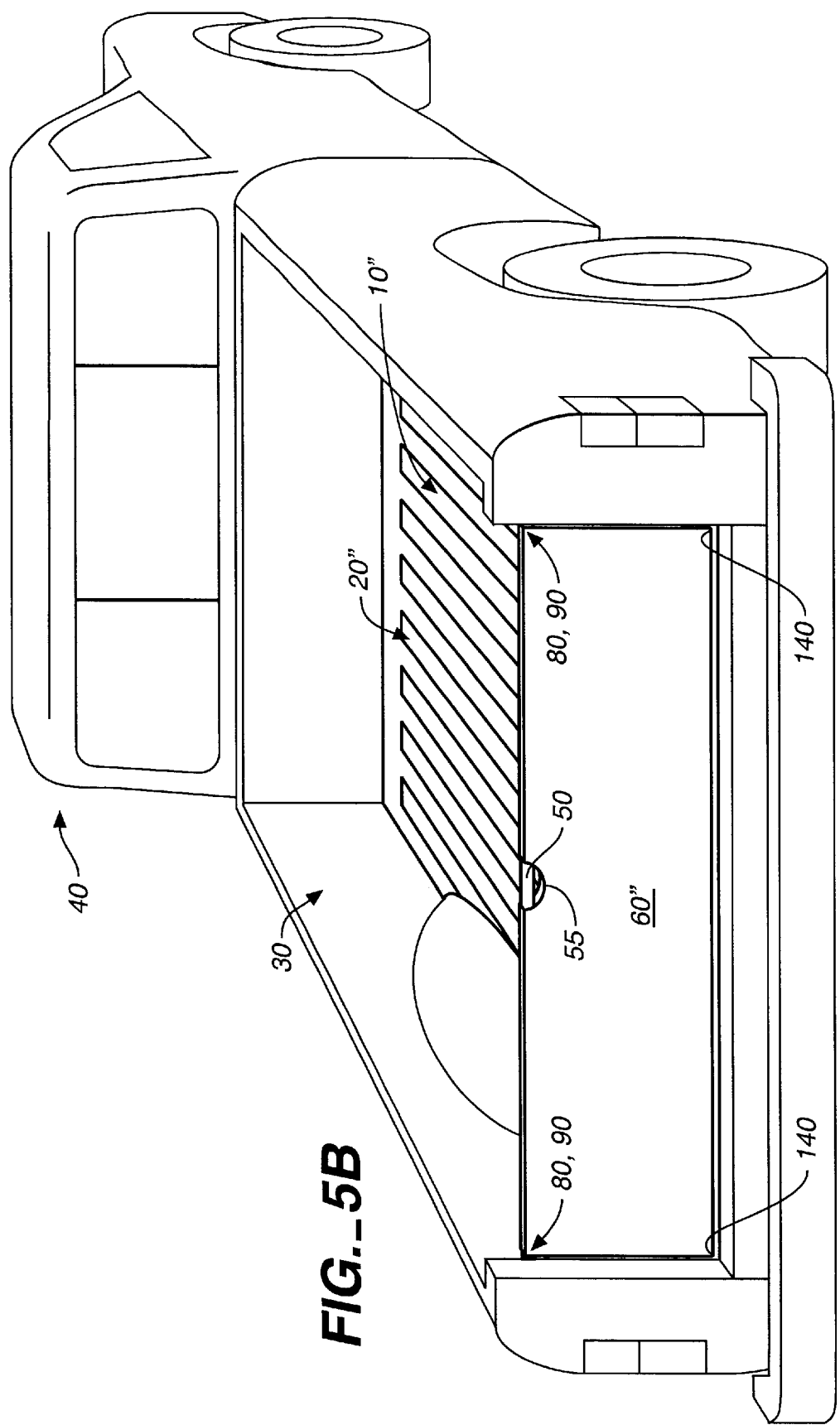
FIG._5B

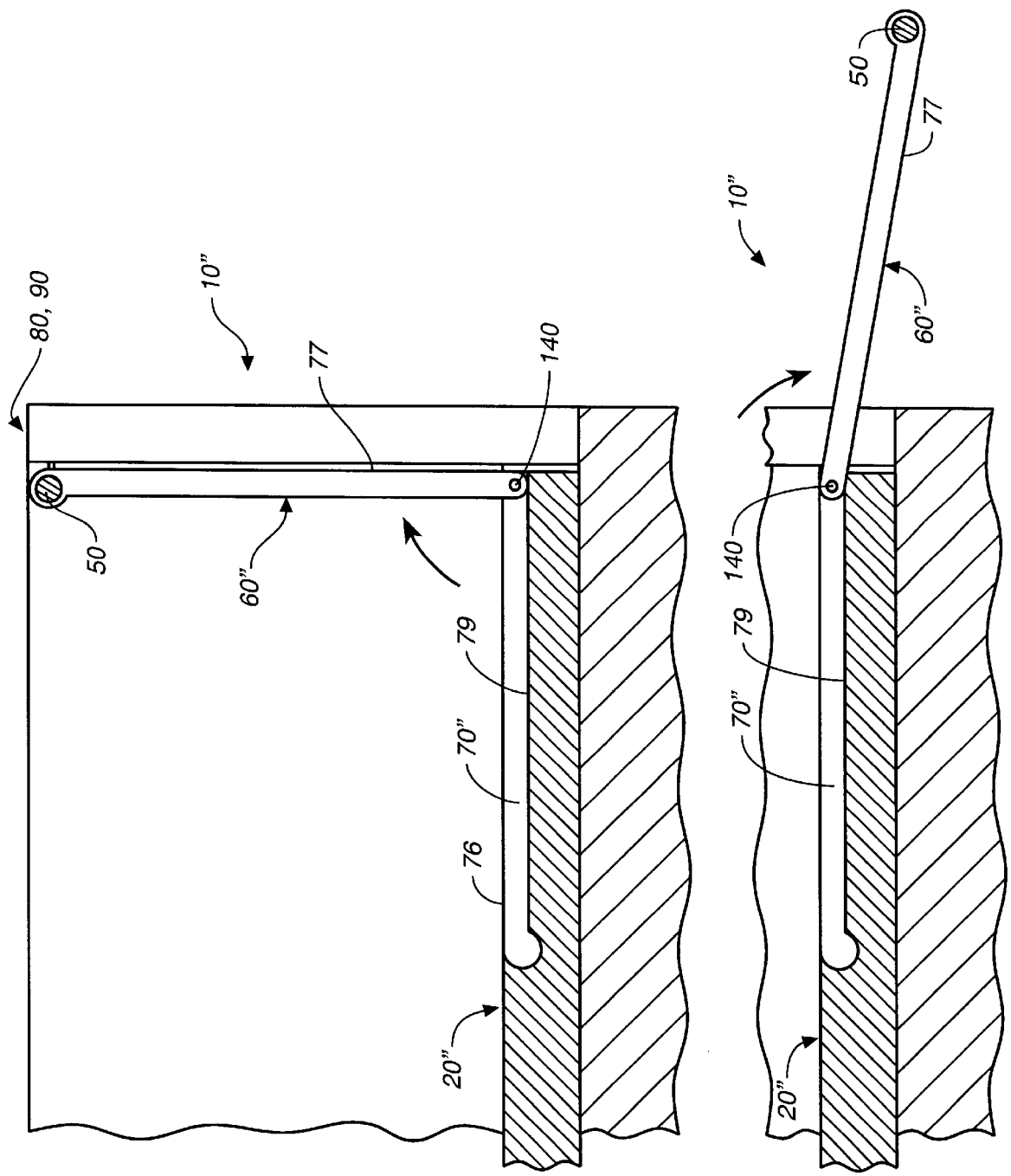
FIG._6A
FIG._6B

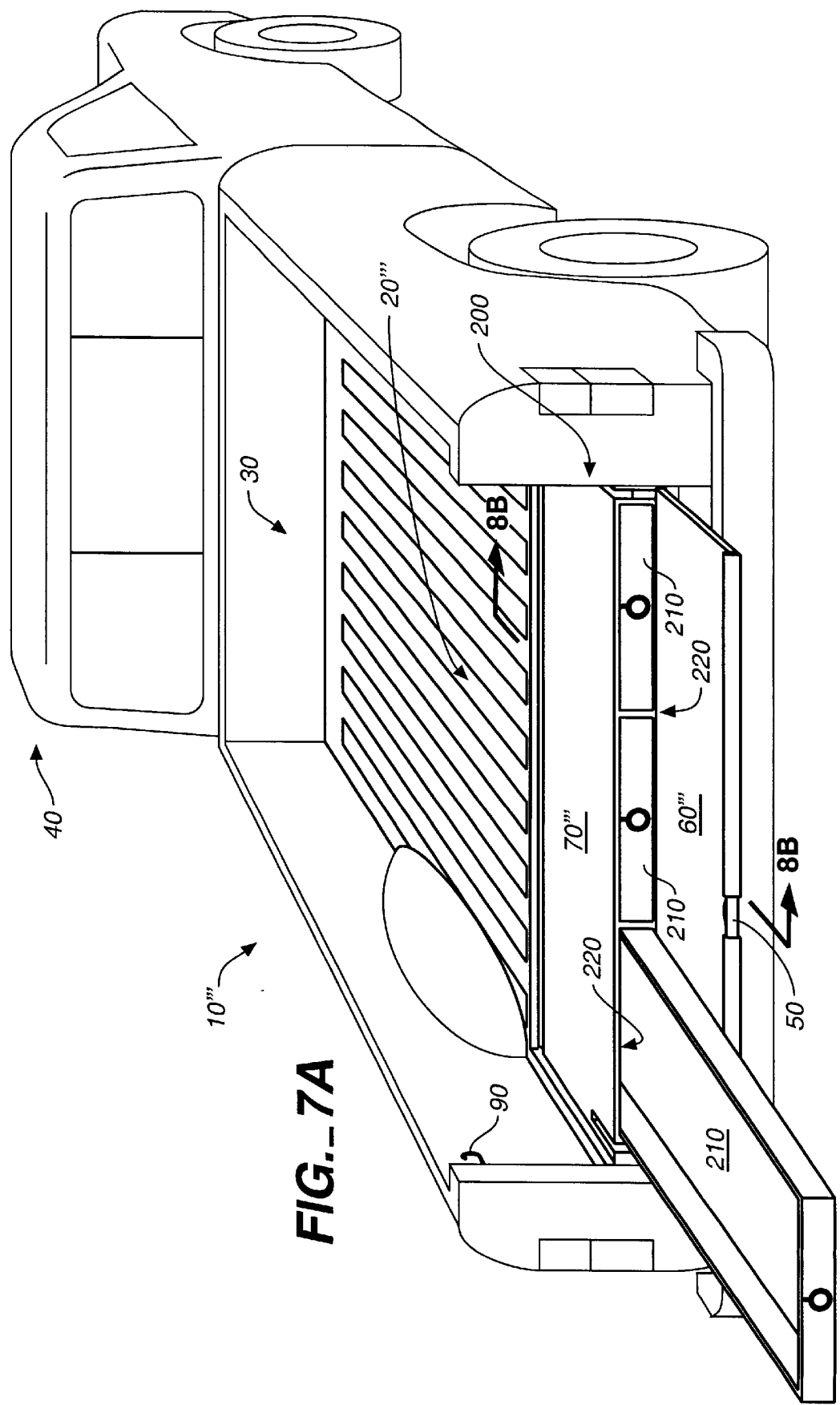

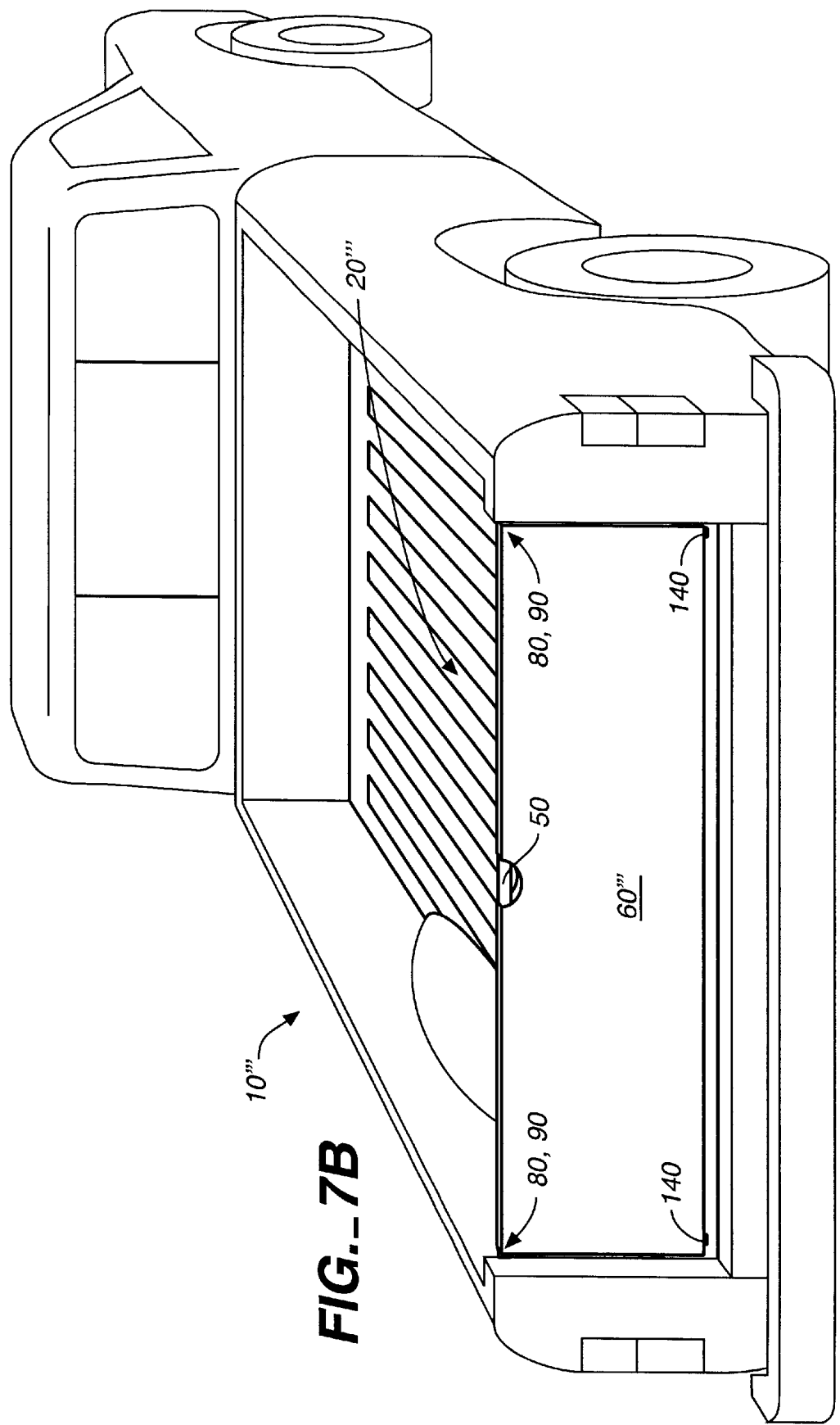

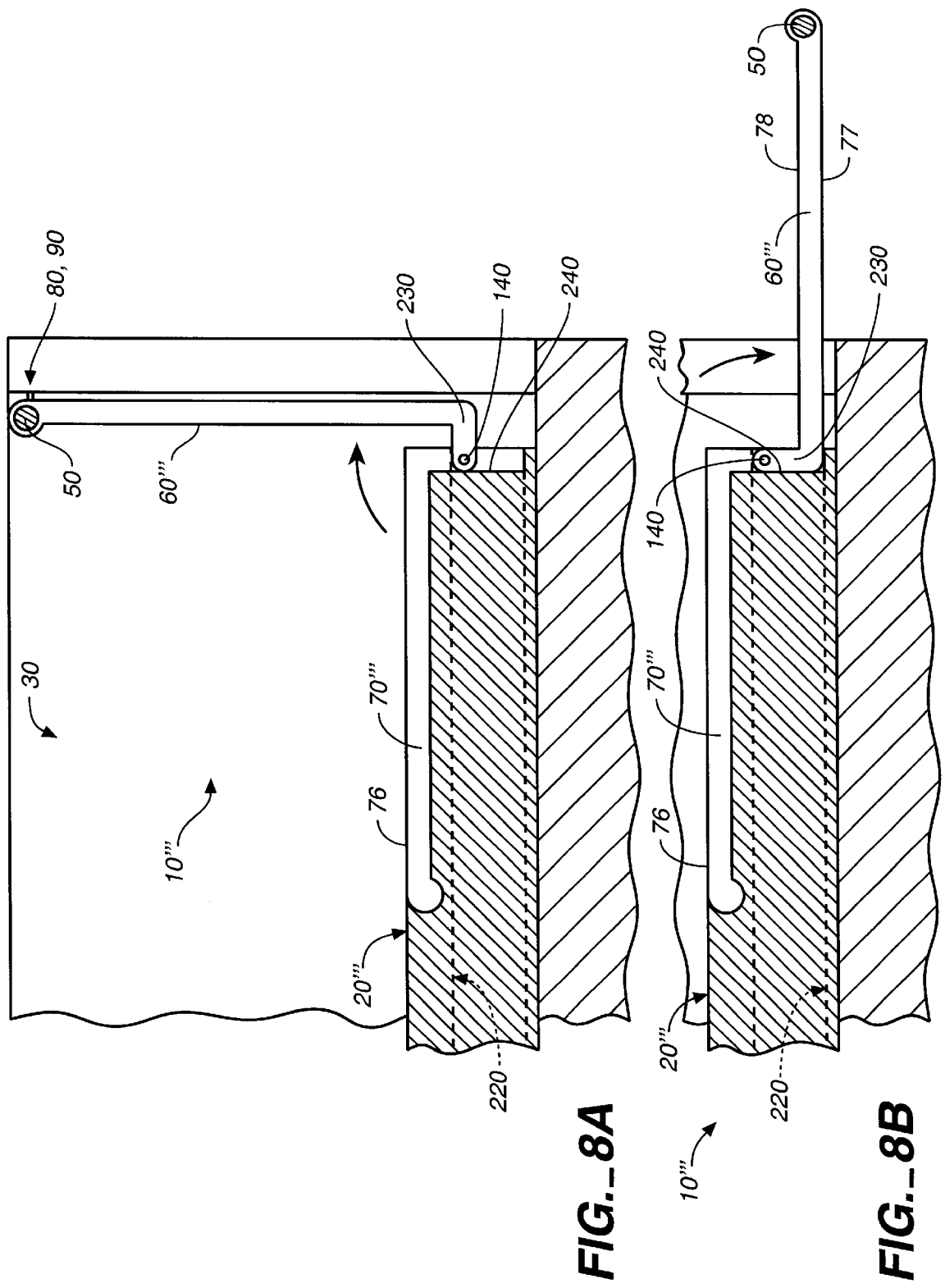

CARGO RESTRAINING GATE ASSEMBLY AND METHOD

TECHNICAL FIELD

The present invention relates, in general, to assemblies and methods for restraining cargo movement in transport vehicles, and more particularly, relates to gate or wall assemblies which define cargo storage spaces and the methods by which such gate assemblies are mounted to and used in transport vehicles.

BACKGROUND ART

On the order of one-half of the motor vehicles sold in the United States today are trucks or sport utility vehicles (SUVs). In addition, many of these vehicles, as well as many passenger cars, mini-vans and the like, are equipped to tow trailers. Thus, today's consumers generally regard the ability to transport cargo of various descriptions as a highly desired feature.

Trucks, SUVs and trailers all typically include a generally horizontally oriented cargo supporting surface or bed that is surrounded by generally vertically oriented side walls, which together define the cargo space of the transport vehicle. Usually one or more of the side walls is movable to provide better access to the cargo space, and most typically the aft wall or tailgate of the transport vehicle can be lowered to provide such access.

While provided as original equipment, the tailgate also can impede cargo loading and unloading by requiring vertical lifting of the cargo over the raised tailgate, or by requiring loading of cargo onto the tailgate and a second step of sliding the cargo horizontally into the cargo space or box. In the lowered position, most tailgates prevent cargo handling personnel from standing immediately next to the open aft end of the cargo box so that cargo can be lifted directly into the cargo box. As a result of cargo loading and unloading problems, pickup truck and trailer owners not infrequently remove the original equipment tailgate and simply tie cargo down in the cargo box or replace the tailgate with a removable mesh or webbing barrier.

Moreover, pickup trucks with fifth wheels mounted in the cargo box area may have the original equipment tailgate removed to allow the trailer towing neck to be coupled to the fifth wheel. When the trailer is detached, however, the truck will have a cargo box which is open at the aft end.

Still further, tailgates are frequently removed from pickup trucks in an attempt to achieve improved gas mileage, even though studies have shown that such practices are not effective.

The approach of simply not having a tailgate is undesirable for many obvious reasons, and the use of mesh or strapping barriers has presented problems in manipulation of the webbing during removal and deployment.

Cargo box bed liners also are in widespread use as a result of the proliferation of pickup trucks, mini-vans and sport utility vehicles. Such bed liners originally were intended to protect the cargo box of the transport vehicle from being damaged during loading and unloading of cargo. More recently, however, such bed liners have also included structures which enable cargo restraint.

The least complex of such cargo restraining bed liners merely provide non-skid surfaces, such as found in the bed liners of U.S. Pat. Nos. 5,570,921 and 5,803,531. Bed liners also may include tailgate padding panels which are supported by the original equipment tailgate, such as may be found in U.S. Pat. No. 5,722,710.

Restraint of the movement of cargo within the four walls of a cargo space using cargo restraining bed liners also has been undertaken. Thus, bed liners which are grooved or pocketed and are used with cooperatively formed, plug-in type, cargo restraining members are well known. Typical of such systems are the devices of U.S. Pat. Nos. 5,131,709, 5,549,428, 5,599,055, 5,655,863, 5,673,956, 5,788,309 and 5,788,310. This type of plug-in cargo restraint approach also has even been used on floor mats for automobiles. See, for example, U.S. Pat. No. 4,222,695.

Additionally, various types of auxiliary equipment have been developed for mounting to or proximate transport vehicle tailgates. Thus, in U.S. Pat. No. 5,788,311 a tailgate-mounted step assembly is disclosed, while in U.S. Pat. No. 5,669,537 a removable storage shelf assembly is mounted proximate the tailgate or lift gate of an SUV or van.

Finally, various cargo compartments have been designed for use in the cargo areas of transport vehicles. Typically, these structures simply have been placed in the cargo area, and as a result, they often permanently significantly reduce the volume of the cargo space available for cargo which cannot be placed in the compartments. Such prior art storage compartments are illustrated, for example, by the systems of U.S. Pat. Nos. 5,615,922 and 5,685,593.

As used herein, the expression "transport vehicle" shall include motor vehicles, such as, pickups, SUVs, vans, automobiles, buses, commercial trucks, watercraft, aircraft, trains, even golf carts, and equivalent motored vehicles intended to transport cargo, as well as towed or unpowered cargo carriers, such as trailers and barges, and equivalent unpowered vehicles intended to transport cargo.

Accordingly, it is an object of the present invention to provide a cargo restraining gate assembly and method for use in a transport vehicle, and a transport vehicle employing the same, which acts as a movable cargo space defining wall for the cargo space of the vehicle.

It is a further object of the present invention to provide a cargo restraining gate assembly and method for a transport vehicle which can be easily installed as an after-market product and which provides a highly effective barrier wall without substantially reducing the cargo space available in the vehicle for holding and transporting cargo.

Another object of the present invention is to provide a stowable cargo restraining gate assembly which is easier to manipulate or operate than conventional transport vehicle gate assemblies, such as tailgates.

Still another object of the present invention is to provide a cargo restraining gate assembly and method which will not impede cargo loading or unloading, is durable, is compact, and is relatively inexpensive to construct.

The transport vehicle gate assembly, vehicle and method of the present invention has other objects and features which will become apparent from, or are described in more detail in, the following description of the Best Mode of Carrying Out the Invention and the accompanying drawing.

DISCLOSURE OF THE INVENTION

The present invention provides a movable or retractable cargo restraining gate assembly, a transport vehicle having such gate assembly, and a method for its use. The gate assembly most preferably is incorporated into a bed liner structure for a cargo space or cargo box of a transport vehicle. The gate assembly includes a bed liner structure having a gate storage cavity or recess that can stowingly receive a cargo restraining gate member that may be a flexible roll-up gate or a relatively inflexible planar gate. In the preferred form, the bed liner structure positions the gate member for deployment across an aft end of the cargo space as a tailgate.

In the roll-up embodiment, one edge of the flexible member preferably is affixed to a roller or axle disposed within an is interior gate storage cavity in the bed liner. Associated with the axle is a spring biasing mechanism that permits the flexible gate member to roll-up, window-shade fashion, around the axle within the bed liner gate storage cavity when not needed. A second edge of the flexible gate member is used as a handle and is simply pulled away from the bed liner gate storage cavity to unwind a length of the gate member. Mechanical couplers releasably couple the flexible gate member in a deployed position to the transport vehicle. With the gate member deployed, a close-walled cargo space is defined in which cargo may be retained.

In the relatively inflexible gate member embodiment, the bed liner structure gate storage cavity is sized to receive the planar gate member in an uncollapsed or distended condition. The rigid gate member is movably attached to the bed liner structure. For example, the gate can be pivoted to the bed liner or pivotally and slidably coupled to the bed liner. The gate is user-moved to, and secured in, a deployed position providing a near vertical wall portion for the cargo space.

Using either embodiment, the cargo restraining gate member may be stowed within the gate storage cavity of the bed liner structure, non-invasively and unobtrusively out of the way. However, when cargo is to be retained in the cargo box, the gate member can be moved or deployed to provide an upright side wall within a few seconds. If desired, the bed liner structure may be eliminated and the tailgate mounted directly to the cargo bed of the transport vehicle as original equipment. Optionally, at least one pull-out drawer sized to retain additional cargo, may be disposed within the bed liner structure beneath the roll-out or inflexible gate member.

The method of the present invention provides a movable wall suitable for deployment into a position defining, in part, a side of a cargo space of a transport vehicle. Briefly, the method is comprised of the steps of mounting one of a flexible and a rigid gate member to the transport vehicle proximate the cargo space, and selectively moving the gate member between a stowed position and a deployed position.

Most preferably, the mounting step is accomplished by mounting a bed liner structure in the cargo space with a flexible gate member stowed in a rolled up condition in the bed liner structure. The moving step is most preferably accomplished by unrolling the flexible gate member from the bed liner structure to a deployed position and securing it as deployed.

BRIEF DESCRIPTION OF THE DRAWINGS

FIG. 1A is a top perspective view of a pickup truck having a rolled-up flexible gate assembly constructed according to the present invention and shown in a stowed position within a bed liner placed in the rear of the pickup truck;

FIG. 1B is a top perspective view of the invention of FIG. 1A with the gate assembly in a partially unrolled and partially deployed position;

FIG. 1C is a top perspective view of the invention of FIG. 1A with the gate assembly in a fully unrolled and fully deployed position;

FIG. 2A is an enlarged, fragmentary, side elevation view in cross section of the gate assembly of FIG. 1A in the stowed position;

FIG. 2B is an enlarged, fragmentary, cross sectional view of the gate assembly partially deployed, as shown in FIG. 1B;

FIG. 2C is an enlarged, fragmentary, cross sectional view of the gate assembly fully deployed, as shown in FIG. 1C;

FIG. 3A is a top perspective view of a bed liner structure and gate assembly partially deployed, as shown in FIGS. 1B and 2B;

FIG. 3B is an enlarged, fragmentary view of an upper end portion of the gate assembly taken substantially of the area bounded by line 3B—3B in FIG. 3A;

FIG. 4A is a side elevation, cross sectional view corresponding to FIG. 2B of an alternative embodiment of the gate assembly of the present invention showing a relatively inflexible gate member partially deployed from a bed liner structure;

FIG. 4B is a side elevation, cross sectional view of the gate assembly shown in FIG. 4A in a fully deployed position;

FIG. 5A is a top perspective view corresponding to FIG. 1A of a further embodiment of the gate assembly with a relatively inflexible gate member shown in a stowed position in a bed liner structure;

FIG. 5B is a top perspective view of the gate assembly shown in FIG. 5A, in an upright, fully deployed position;

FIG. 6A is an enlarged, fragmentary, side elevation view in cross section, corresponding to FIG. 4B, of the gate assembly shown in FIG. 5B in the fully deployed position;

FIG. 6B is an enlarged, fragmentary, cross section view of the gate assembly shown in FIG. 6A with the relatively inflexible gate member in an extended position;

FIG. 7A is a top perspective view of a further embodiment of the cargo restraining gate assembly of the present invention incorporating the features shown in FIGS. 5A to 6B, as well as drawer storage structure;

FIG. 7B is a top perspective view of the gate assembly shown in FIG. 7A with the gate member in an upright, deployed position;

FIG. 8A is an enlarged, fragmentary, side elevation view in cross section of the invention of FIGS. 7A and 7B, taken substantially along line 8B—8B in FIG. 7A, with the gate member in an upright, deployed position; and FIG. 8B is an enlarged, fragmentary, side elevation view in cross section of the gate assembly corresponding to FIG. 8A with the gate member in a horizontal position.

BEST MODE OF CARRYING OUT THE INVENTION

The cargo restraining gate assembly of the present invention is particularly well suited for providing a movable side wall for a cargo space in a cargo transport vehicle. The gate assembly can be moved between a stowed position, giving access to the cargo space, and a deployed position, in which the gate member acts as at least part of a side wall used to restrain cargo in the cargo space. Most preferably, the side wall is an aft wall and the gate member acts as a tailgate for the transport vehicle.

Referring now to FIG. 1A through FIG. 3B, a preferred form of a cargo restraining gate assembly, generally designated 10, of the present invention is illustrated. Gate assembly 10, as best seen in FIG. 3A, includes a bed liner structure, generally designated 20, and a gate member, generally designated 60. In the embodiment of FIGS. 1A to 3B, gate member 60 is provided as a flexible gate member, such as a membrane, web or sheet of material. Flexible gate member 60 can be seen in FIG. 1A to be stowed out of sight within bed liner structure 20, which in turn is mounted within a cargo space 30 of a transport vehicle 40. Bed liner structure 20 is sized and shaped to fit within cargo space 30 of vehicle 40, a pickup truck, on top of an upwardly facing cargo supporting surface or bed 25. Cargo space 30 is, therefore, defined by bottom wall or bed 25 and side walls 26, 27, and 28. Flexible gate member 60, when deployed provides the final side wall across an aft end 31 of vehicle 40.

In the stowed position depicted in FIG. 1A, gate member 60 is stored non-invasively in bed liner 20, leaving cargo space 30 of vehicle 40 substantially unobstructed for normal use of this region. As described hereinafter, flexible gate member 60 requires no tie-downs or other apparatus for stowing, which other apparatus could interfere with use of cargo space 30. Indeed, the only visible portion of gate member 60 is a rod-like or tubular end member 50, which acts as a handle and is seen through a hand-opening 55 formed in bed liner structure 20.

In FIG. 1B, flexible gate member 60 is shown in the process of being unrolled from a gate storage cavity 70 formed in the rear end portion of bed liner structure 20. Unrolling of gate member 60 may be accomplished by grasping the exposed portion of member 50, access to which is facilitated by a moon-shaped hand opening 55 in the rear edge of bed liner structure 20. The user pulls member 50 out of a rectangular slot-like opening 65 in the rear edge 75 of structure 20 pulling on member 50 unrolls flexible gate member 60 from an axle or roller 110, which is rotatably mounted to liner structure 20 in gate storage cavity 70.

As may be seen in FIGS. 1B and 3B, attached to or formed on the ends of rod-like or tubular member 50 are projecting coupler members 80. When flexible gate member 60 is in a vertical deployed position, as shown in FIG. 1C, coupler members 80 cooperatively releasably engage with hooks or other coupler members 90 affixed to vehicle 40. C shaped hooks on other coupler members 90, open to the top and rear of the vehicle so as to couple with coupler members 80, and can be mounted to vehicle 40 proximate aft end 31. The cooperation between respective coupler members 80 and 90 releasably retains gate 60 in an upright deployed position. Thus, with flexible gate member 60 in the unrolled, vertical position shown in FIG. 1C, cargo 100 within cargo space 30 will be limited on all four sides against lateral movement.

As can be seen from FIG. 1A, flexible gate assembly 10 of the present invention allows user to stand immediately adjacent to cargo space 30 during loading and unloading of the vehicle, and yet upon deployment of gate 60 to the position of FIG. 1C, the cargo is limited or retained against lateral movement out of the cargo box. This movable cargo restraining gate assembly also can be used for fifth wheel applications, and if preferred by users, gate 60 can be stowed when no cargo is being transported by vehicle 40 for whatever gas mileage effect the user believes may be achieved.

Cargo bed liner structure 20 is here illustrated as positioned in abutting relation against bottom wall or bed 25 of cargo space 30. It will be understood that some bed liner structures also extend vertically along the side walls of the cargo box. It is within the scope of the present invention, therefore, that flexible gate member 60 could be mounted in a gate storage cavity 70 provided in one or both of the side walls of such a bed liner structure. Thus, one or two flexible gates 60 could be deployed laterally from gate storage cavities in the bed liner side walls (not shown) from vertically oriented axles or rollers (not shown) proximate corners 41 of the vehicle cargo box. The flexible gate or gates 60 would be unrolled laterally across the aft end 31 of cargo space 30 and coupled to each other, or for a single gate, coupled to the opposite side wall.

In another broad aspect of the present invention, a flexible gate member 60 also could be mounted in a rolled up condition in a gate storage cavity 70, which is provided as original equipment in truck bed 25 or in truck side walls 26 and 28 at corners 41. A bed liner structure, in this embodiment of the invention, would not be required. However, mounting of a gate member 60 in a gate storage cavity 70 of a bed liner structure 20 allows easy retrofitting of existing transport vehicles with the cargo restraining gate assembly of the present invention.

As also can be seen from FIG. 1A, corners 41 of cargo space 30 could easily receive a corner-mounted housing in which a vertically oriented axle and flexible gate member are mounted for unrolling transversely across the aft end of the cargo box. As used herein, therefore, the expression "bed liner structure" includes such corner housing assemblies, as well as the horizonal bed liner of FIGS. 1A–3A, and bed liners which have the gate member mounted in one or more vertically oriented side walls of the bed liner.

The details of construction of roll-up cargo restraining gate assembly 10 can be described in more detail by reference to FIG. 2A. In the fully stowed position shown in FIG. 2A, the totality of flexible gate 60 is preferably rolled up about a roller or axle member 110, analogous to the rolling-up of a window shade. Gate storage recess 70 is sized to be sufficiently large to accept the bulk of rolled up gate member 60. As best shown in FIG. 2C, coupled between bed liner structure 20 (or vehicle 40) and roller member 110 may be a spring biasing mechanism 120. Spring biasing mechanism 120 biases roller 110, and thus flexible gate member 60, to roll up into gate storage cavity 70 when the gate assembly is not being used. Flexible gate member 60 is, therefore, biased toward a stowed position in which it is compactly stored about roller or axle 110. Spring biasing retraction mechanisms 120 are well known to those skilled in the mechanical arts and will not be described in detail herein. If desired, biasing mechanism 120 may include a locking-releasable ratchet-type locking assembly that can reduce tension on membrane like gate member 60 when in the fully deployed position shown in FIG. 2C. Spring biasing is not an absolute requirement of the flexible embodiment of the present invention since manual or powered roller cranking assemblies also could be employed.

In all embodiments of the present invention, it is desirable that bed liner structure 20 have a relatively small height dimension or thickness, T, as compared to the height of cargo space 30 or gate member 60 in the deployed position. This ensures that a minimum amount of the storage volume of cargo space 30 is occupied by the bed liner structure. Understandably, thickness T of bed liner structure 20 (FIG. 2A) must be sufficient, at least proximate aft end 31, to house rolled-up flexible gate member 60, as well as any associated axle 110 and spring biasing mechanism 120. Preferably a substantial portion of the transverse end member 50 attached to the outermost or upper edge of gate member 60 also is recessed in bed liner structure 20. In practice, thickness T need only be on the order of a few centimeters in thickness, for example, 2 to 10 centimeters.

In FIG. 2B, a user (not shown) pulls on member 50 to begin withdrawing or unrolling gate member 60 from gate storage cavity 70. This movement is indicated by the curved arrow in FIG. 2B. As flexible gate member 60 is withdrawn from gate storage cavity 70, the preferred embodiment causes biasing unit 120 to create a rewind biasing force that will help return gate member 60 to storage cavity 70 when the gate is released for stowing.

In FIG. 2C, flexible gate member 60 is substantially deployed and is more or less vertical to the plane of bed liner structure 20. The user has hooked couplers 80 on couplers 90, and cooperation between couplers 80 and 90 releasably couples gate member 60 in the upright deployed position shown in FIGS. 1C and 2C.

Turning now to FIG. 3A, bed liner structure 20 is shown removed from (or prior to installation within) cargo space 30 of transport vehicle 40. In FIG. 3B, a form of coupler member 80 is shown in detail. In the preferred embodiment, each coupler member 80 includes a notch 85 sized to matingly engage coupler member 90. Coupler member 80 optionally may be spring loaded or biased such that the distal tip of member 80 is urged outwardly away from the end of tubular edge member 50, but member 80 also may be fixed in relation to member 50. The design and implementation of such coupler members 80 are known to those skilled in the mechanical arts and for that reason further details are not given herein.

In the embodiments thus far described, gate member 60 has been sufficiently flexible to be rolled-up about a roller or axle. Flexible gate member 60 could be fabricated from a flexible nylon or plastic sheet material, from a heavy duty natural or synthetic fabric material, from a flexible metal sheet or mesh, among other materials.

In the alternative embodiment of the cargo restraining gate assembly of the present invention shown in FIGS. 4A and 4B, a gate assembly, generally designated 10', is provided which includes a relatively inflexible or rigid gate member 60'. When gate member 60' is to be deployed from gate storage cavity 70', the gate is slid outwardly from cavity 70', as shown by arrow 71 in FIG. 4A, to a horizontal position. Next, as shown in FIG. 4B, gate member 60' is rotated by a user into a substantially vertical deployed position.

Bed liner structure 20' includes an aft end in which gate storage cavity 70' is defined by upper wall portion 72 and spaced apart lower wall portion 73. Preferably, upper wall portion 72 is supported so that cargo can be positioned thereon without impeding or impairing deployment or stowing of gate member 60'. Again, bed liner structure 20' preferably is sized and shaped to fit into a cargo space 30 of a transport vehicle. As shown in FIG. 4A, the upper edge of gate member 60' preferably, but not necessarily, includes a manually grippable edge member 50'. Since gate 60' is relatively rigid, the upper edge of the gate member can simply be integrally formed with a manually engageable handle portion 50'. A slidable pivot or hinge assembly 130, preferably disposed at the left and right sides of gate member 60', permits gate member 60' to pivot through approximately 90° (as shown by arrow 74 in FIG. 4B).

A further modified embodiment of the cargo restraining gate assembly of the present invention is shown in FIGS. 5A through 6B. In this embodiment, a relatively inflexible gate member 60" of assembly 10" lies flat atop a rear portion bed liner structure 20" when stowed away, rather than being stowed within the bed liner, as shown in FIGS. 4A and 4BA. A gate storage cavity 70" is formed in an upper surface 76 of bed liner structure 20", as shown in FIGS. 6A and 6B, such that when stowed, as shown in FIG. 5A, the outwardly facing surface 77 of deployed gate member 60" lies substantially flush with uppermost surface 76 of the bed liner. The bottom surface 79 of storage cavity 70" should be capable of the support of cargo thereon.

In FIG. 5B, gate member 60" has been rotated 90° to an upright deployed position that is secured using coupler members, such as members 80 and 90, described earlier herein. As shown in FIG. 6B, hinge or pivot assembly 140 may be such that gate member 60" can rotate by about 180° from the flush, stowed position shown in FIG. 5A to a near horizontal position.

Features of the various embodiments previously described have been combined in the cargo restraining gate assembly 10''', as shown in FIGS. 7A to 8B. As shown, assembly 10''' includes a hinged relatively rigid gate member 60''' carried by a bed liner structure 20''' having an upwardly opening gate storage cavity 70''' similar in configuration to FIGS. 6A and 6B. If desired, gate member 60''' could be replaced with the roll-stowable non-rigid gate member, such as was depicted in FIGS. 1A to 3B. System 10''' provides an additional storage feature by including an assembly 200 of slidable drawers 210 stowable in drawer cavities 220 formed within bed liner structure 20'''. Drawers 210 are especially useful for storing tools and the like, and advantageously may be made removable from drawer cavities 220. Thus, a drawer and its contents can be removed en masse, for example, from the bed liner to provide tools for work to be performed remote of cargo space 30 of vehicle 40.

As shown in FIG. 8A, rigid gate member 60''' preferably is stowable flush within gate storage cavity 70''' formed in the upper surface of bed liner structure 20'''. In FIG. 8A, gate member 60''' has been rotated approximately 90° from the stowed position into an upright or near vertical deployed position. This deployed position is used when assembly 10''' is to secure cargo in cargo space 30 portion of transport vehicle 40, and it may be maintained using cooperating couplers 80, 90, such as have been described, or similarly functioning mechanisms.

Gate member 60''' preferably is formed with an offset or dog leg portion 230 such that the overall gate structure has an "L" shape. When rigid gate member 60''' is rotated to a horizontal position (as shown in FIG. 8B), short leg portion 230 of the "L" abuts the rear vertical edge 240 of bed liner structure 20''' to provide firm support for positioning of the gate member in a horizontal position. Thus, loads may be placed atop upwardly facing surface 78 of gate member 60''' without unduly stressing the gate assembly.

Although the various embodiments of the present invention have been described with respect to installation within the rear bed of a pickup truck, the invention may be installed to secure cargo in other transport vehicles. It will be appreciated, therefore, that the cargo restraining gate assembly of the present invention could instead be used to secure cargo in a bus, boat, airplane, train, trailer, barge or almost any other vehicle used to transport cargo.

In the various described embodiments, gate assemblies 10, 10', 10" or 10''' were mounted to a bed liner structure 20, 20', 20" or 20''' that were sized and shaped to fit within the cargo space 30 of the transport vehicle 40. The bed liner may be permanently affixed to the cargo bed, e.g., using attachment screws or the like, or may simply be laid over the upwardly facing, cargo-supporting, bottom wall or bed wall 25. However, the function of the bed liner structure instead could be incorporated into an original equipment gate storage cavity formed in the horizontal bed of the transport vehicle, or formed in one or more of the side walls of the transport vehicle surrounding the periphery of bottom wall or bed wall 25. Thus, a transport vehicle manufacturer could fabricate the cargo space of a transport vehicle with gate storage cavities to accommodate either of a stowable flexible gate member or a relatively rigid gate member, described for the bed liner based versions of the present invention.

Those skilled in the mechanical arts will recognize that the various hinge, pivot, and coupler mechanisms used with the present invention may be implemented in a number of ways using various techniques. For these reasons, a detailed description of various hinges or couplers or the like has not been presented herein.

The various components of gate assemblies 10, 10', 10" and 10''' may be constructed from materials appropriate for the cargo to be stowed. In heavy duty installations, construction of the components may require metal, aluminum or steel perhaps, whereas in other installations a composite or reinforced plastics may be used, perhaps overcoated with metal to provide surface protection.

In the various embodiments, it will be appreciated that the components of cargo restraining gate assemblies 10 or 10' or 10" or 10''' may be stowed away when not in use such that the bed of the transport vehicle is readily usable for various tasks. When cargo is to be secured, deployment of gate member 60 or 60' or 60" or 60''' is carried out within a few seconds. When gate member 60, 60', 60", 60''' is no longer needed in the deployed position, it is stowable within the bed liner structure within a few seconds.

Having described the apparatus of the present invention, the present method ban be briefly set forth.

A method of restraining cargo 100 in a cargo space 30 of a transport vehicle 40 is provided. Broadly, the method includes the steps of mounting a bed liner structure 20, 20', 20", 20''' in cargo space 30 with the bed liner structure having a movable gate member 60, 60', 60", 60''' stowed therein, preferably in a gate storage cavity 70, 70', 70" 70'''. The method includes the further steps of, after the mounting step, selectively moving the gate member between a stowed position and a deployed position providing a side wall for cargo space 30, and when in the deployed position releasably securing the gate assembly as deployed.

In a preferred method, the mounting step is accomplished by mounting a bed liner structure having a flexible gate member 60 stowed therein, and the moving step is accomplished by unrolling and rolling flexible gate member 60 to cause the same move between the stowed and deployed positions.

Another broad aspect of the present method includes the steps of mounting a flexible gate member 60 in a rolled up condition proximate a cargo space 30 and unrolling the gate member to a deployed position providing a cargo restraining wall for cargo space 30.

Modifications and variations may be made to the disclosed apparatus and method without departing from the subject and spirit of the invention, as defined by the following claims.

What is claimed is:

1. A cargo restraining gate assembly for a transport vehicle comprising:
   a bed liner structure formed for positioning in abutting relation to a portion of a wall defining a cargo space in said transport vehicle, said bed liner structure including a gate storage cavity therein; and
   a cargo restraining gate member mounted to said bed liner structure for movement of said gate member between a stowed position in said gate storage cavity and a deployed position extending outwardly from said gate storage cavity to a position providing a side wall for said cargo space, said gate member being provided as one of:
   (i) a flexible gate member stowable in said gate storage cavity in a rolled up condition, and
   (ii) a relatively inflexible gate member stowable in said gate storage cavity; and
   said bed liner structure being formed for support of cargo thereon in a position at least partially over said gate storage cavity during movement of said gate member between said stowed position and said deployed position.

2. The cargo restraining gate assembly as defined in claim 1 wherein,
   said gate member is movable to and releasably securable in a deployed position providing a tailgate on an aft side of said cargo space.

3. The cargo restraining gate assembly as defined in claim 1 wherein,
   said gate member is the relatively inflexible gate member having a width dimension approximating a width dimension of said bed liner structure.

4. The cargo restraining gate assembly as defined in claim 3 wherein,
   said gate storage cavity is defined by upper and lower spaced apart wall portions of said bed liner structure; and
   a coupling assembly mounting an edge of said gate member to said bed liner structure for both sliding and pivotal movement between said stowed position and said deployed position.

5. The cargo restraining gate assembly as defined in claim 3 wherein,
   said gate member includes a material selected from a group consisting of (a) metal, (b) plastic, and (c) reinforced nylon.

6. The cargo restraining gate assembly as defined in claim 3 wherein,
   said bed liner structure includes at least one drawer cavity; and
   a drawer slidably mounted in said drawer cavity.

7. The cargo restraining gate assembly as defined in claim 6 wherein,
   said drawer cavity opens to an aft end of said cargo space and is positioned below said gate storage cavity.

8. A cargo restraining gate assembly for a transport vehicle comprising:
   a gate housing structure formed for mounting proximate a wall defining a cargo space in said transport vehicle, said gate housing structure including a gate storage cavity therein; and
   a flexible cargo restraining gate member mounted in said gate housing structure for movement of said gate member between a rolled up stowed position inside said gate. storage cavity and a distended deployed position extending outwardly from said gate storage cavity to a position providing a side wall for said cargo space, said gate housing structure being sufficiently rigid to enable movement of said gate member between said stowed position and said deployed position while cargo is supported over at least a portion of said gate storage cavity in said cargo space.

9. A transport vehicle comprising:
- a vehicle body including a generally horizontally oriented cargo supporting bed, and at least one generally vertically extending side wall positioned around a portion of a periphery of said bed to define a cargo space;
- a bed liner structure positioned over and supported on said bed and formed of a relatively rigid material for support of cargo thereon and defining a gate storage cavity therein; and
- a cargo restraining gate member mounted to said bed liner structure for movement of said gate member between a stowed position inside said gate storage cavity and a deployed position extending outwardly from said gate storage cavity to a position providing a length of side wall for said cargo space while cargo is supported over said gate storage cavity, said gate member being provided as one of:
  - (i) a flexible gate member stowable in said gate storage cavity in a rolled up condition,
  - (ii) and a relatively inflexible gate member stowable in said gate storage cavity.

10. A stowable gate assembly for securing cargo in a cargo storage space of a transport vehicle comprising:
- a substantially planar bed liner structure sized to be substantially as large as said cargo storage space, said bed liner structure defining at least one gate storage cavity;
- a roller rotatably disposed within said gate storage cavity along an axis parallel to a side of said bed liner structure; and
- a flexible gate member having a width approximating a width of said side of said bed liner structure and having an edge attached to said roller, said flexible gate member being sufficiently flexible in a stowed position to be wound about said roller and being sufficiently strong when at least partially unrolled from roller to be used as a side wall to retain cargo in said cargo storage space.

11. A method of restraining cargo in a cargo space of a transport vehicle comprising the steps of:
- mounting a bed liner structure in said cargo space having a movable gate member stowed therein in a position for deployment from said bed liner structure while cargo is supported on said bed liner structure over said gate member; and
- after said mounting step, selectively moving said gate member between a stowed position in said bed liner structure and a deployed position providing a side wall for said cargo space.

12. The method as defined in claim 11 wherein,
said mounting step is accomplished by mounting the bed liner structure having the relatively rigid gate member movably stowed in the gate storage cavity in said bed liner structure.

13. The method as defined in claim 12 wherein,
said mounting step is accomplished by mounting said bed liner structure with the rigid gate member pivotally coupled to said bed liner structure for movement between said stowed position and said deployed position.

14. A method of providing a movable, cargo space defining, wall for a transport vehicle comprising:
- mounting a bed liner structure in said cargo space having relatively rigid outer walls defining a gate storage cavity within said bed liner structure;
- mounting a flexible gate member in said gate storage cavity in a rolled up condition proximate said cargo space;
- unrolling said flexible gate member to a deployed position providing a cargo restraining wall for said cargo space; and
- securing said flexible gate member in said deployed position.

15. The method as defined in claim 14 wherein,
said mounting step is accomplished by mounting of said bed liner structure in said cargo space in a position allowing said flexible gate member to be unrolled across an aft end of said cargo space to provide a tailgate.

16. A cargo restraining gate assembly for a transport vehicle comprising:
- a bed liner structure formed for positioning in abutting relation to a portion of a wall defining a cargo space in said transport vehicle, said bed liner structure defining a gate storage cavity therein; and
- a cargo restraining flexible gate member mounted in a rolled up condition on an axle rotatably mounted to said bed liner structure in said gate storage cavity for movement of said flexible gate member between a stowed position in said gate storage cavity and a deployed position extending outwardly from said gate storage cavity to a position providing a side wall for said cargo space.

17. The cargo restraining gate assembly as defined in claim 16 wherein,
said bed liner structure is formed for positioning over an upwardly facing cargo supporting surface defining said cargo space, and said bed liner structure is formed with a transversely extending slot in an aft end thereof; and
said flexible gate member extends through said slot and is movable between said stowed position and said deployed position through said slot.

18. The cargo restraining gate assembly as defined in claim 17 wherein,
said bed liner structure, said slot and said flexible gate member each have a width dimension approximating a width dimension of said cargo space; and
said gate storage cavity in said bed liner structure is sized to receive said axle with an axis of rotation parallel to said width dimension and an edge of said flexible gate member attached to said axle.

19. The cargo restraining gate assembly as defined in claim 16, and
a coupling device provided on said flexible gate member and formed to releasably couple said flexible gate member to said transport vehicle in said deployed position.

20. The cargo restraining gate assembly as defined in claim 16 wherein,
said flexible gate member is provided by a flexible sheet of material selected from a group consisting of (a) metal, (b) plastic, and (c) fabric.

21. A cargo restraining gate assembly for a transport vehicle comprising:
- a bed liner formed to define a gate housing structure and formed for positioning in a generally horizontal orientation over an upwardly facing cargo supporting surface proximate a wall defining a cargo space in said transport vehicle, said gate housing structure including a gate storage cavity therein; and a flexible cargo restraining gate member mounted in said gate housing structure for movement of said gate member between a rolled up stowed position inside said gate storage cavity and a distended deployed position extending outwardly from said gate storage cavity to a position providing a side wall for said cargo space.

22. A cargo restraining gate assembly for a transport vehicle comprising:

a bed liner formed for mounting proximate a wall defining a cargo space in said transport vehicle, said bed liner having a gate housing structure including a gate storage cavity positioned proximate an aft end of said bed liner; and a flexible cargo restraining gate member mounted in said gate housing structure for movement of said gate member between a rolled up stowed position inside said gate storage cavity and a distended deployed position extending outwardly from said gate storage cavity to a position providing a tailgate for said cargo space.

23. transport vehicle comprising:

a vehicle body assembly having a generally horizontally oriented cargo supporting bed and at least one relatively rigid near vertical side wall defining a cargo space, a bed liner structure mounted on top of said cargo supporting bed and defining a gate storage cavity therein proximate a side of said cargo supporting bed; and a cargo restraining flexible gate member mounted to said vehicle body assembly in a rolled up condition in said gate storage cavity, said flexible gate member being movable between a stowed position inside said gate storage cavity and a deployed position extending outwardly from said gate storage cavity to a position providing at least part of a side wall for said cargo space.

24. A method of restraining cargo in a cargo space of a transport vehicle comprising the steps of:

mounting a bed liner structure in said cargo space having a flexible gate member stowed therein in a rolled up condition; and after said mounting step, selectively moving said gate member between a stowed position in said bed liner structure and a deployed position providing a side wall for said cargo space by unrolling and rolling said flexible gate member.

* * * * *

UNITED STATES PATENT AND TRADEMARK OFFICE
CERTIFICATE OF CORRECTION

PATENT NO.    : 6,302,465 B1
DATED         : October 16, 2001
INVENTOR(S)   : Faber et al.

It is certified that error appears in the above-identified patent and that said Letters Patent is hereby corrected as shown below:

Column 3,
Line 7, after "an" delete "is".

Column 5,
Line 13, after "liner" and before "20" insert -- structure --.
Lines 29 and 30, after "rear edge 75 of" insert -- bed liner --; after "20" insert a period -- . --; and delete "pulling" and insert therefor -- Pulling --.
Line 32, after "to" insert -- bed --.
Line 39, after "hooks" delete "on" and insert -- or --.

Column 8,
Line 63, after "bed" delete "wall".

Column 9,
Line 3, after "bed" delete "wall".

Column 11,
Line 52, after "relatively" delete "rigid" and insert -- flexible --.
Line 57, delete "rigid".

Column 123,
Line 22, insert -- A -- before "transport".

Signed and Sealed this

Twenty-fifth Day of June, 2002

Attest:

Attesting Officer

JAMES E. ROGAN
Director of the United States Patent and Trademark Office